(12) United States Patent
Ozawa (10) Patent No.: US 10,571,239 B2
(45) Date of Patent: Feb. 25, 2020

(54) DISPLACEMENT MEASURING DEVICE (71) Applicant: Teruko Ishikawa, Tokyo (JP)

(72) Inventor: Yoshihiro Ozawa, Tokyo (JP)

(73) Assignee: Teruko Ishikawa, Tokyo (JP)

( * ) Notice: Subject to any disclaimer, the term of this patent is extended or adjusted under 35 U.S.C. 154(b) by 139 days.

(21) Appl. No.: 15/576,496

(22) PCT Filed: Apr. 12, 2017

(86) PCT No.: PCT/JP2017/015024
§ 371 (c)(1),
(2) Date: Nov. 22, 2017

(87) PCT Pub. No.: WO2018/100762
PCT Pub. Date: Jun. 7, 2018

(65) Prior Publication Data
US 2019/0003814 A1    Jan. 3, 2019

(30) Foreign Application Priority Data
Nov. 30, 2016    (JP) .................................. 2016-232026

(51) Int. Cl.
*G01B 5/14*    (2006.01)
*G01B 5/24*    (2006.01)
*G01B 5/00*    (2006.01)

(52) U.S. Cl.
CPC ................. *G01B 5/24* (2013.01); *G01B 5/00* (2013.01); *G01B 5/14* (2013.01)

(58) Field of Classification Search
CPC ........... G01B 5/02; G01B 5/14; G01L 5/0052; G01M 7/08; G09B 23/32
(Continued)

(56) References Cited

U.S. PATENT DOCUMENTS 2,849,801 A     9/1958  Kustusch
5,414,942 A *   5/1995  Moore ..................... B25H 7/04
                                                    33/332
(Continued)

FOREIGN PATENT DOCUMENTS

CN    102483318 A    5/2012
CN    104299501 A    1/2015
(Continued)

OTHER PUBLICATIONS

Jul. 11, 2017 International Search Report issued in International Patent Application No. PCT/JP2017/015024.
(Continued)

*Primary Examiner* — Christopher W Fulton
(74) *Attorney, Agent, or Firm* — Oliff PLC (57) ABSTRACT

A displacement measuring device includes: a probe having a telescopic structure capable of extending and contracting as a whole; and a measuring unit configured to measure a displacement of a front end relative to a base end of the probe, the probe includes a single cylindrical body or a plurality of cylindrical bodies having different diameters and a columnar or cylindrical front end member that is movably inserted into the single cylindrical body or the cylindrical body having the smallest diameter and of which a front end is mounted to a displacement measuring object, and the single or the plurality of cylindrical bodies and the front end member have a rotation applying mechanism that applies a rotation movement in conjunction with a forward/backward movement when the inner cylindrical body or the front end member moves forward/backward relative to the outer cylindrical body in an extension and contraction direction.

8 Claims, 7 Drawing Sheets

(58) Field of Classification Search
USPC .................................. 33/538, 809, 810, 832
See application file for complete search history.

(56) References Cited

U.S. PATENT DOCUMENTS

| | | | |
|---|---|---|---|
| 5,920,198 A * | 7/1999 | Suzuki | G01D 5/2415 |
| | | | 324/662 |
| 8,201,340 B2 * | 6/2012 | Steffensen | G01C 15/06 |
| | | | 33/296 |
| 9,251,720 B2 | 2/2016 | Ozawa | |
| 2008/0244921 A1 * | 10/2008 | Silberman | G01B 3/08 |
| | | | 33/832 |
| 2012/0131806 A1 | 5/2012 | Jourdan | |
| 2017/0016709 A1 | 1/2017 | Verschut et al. | |

FOREIGN PATENT DOCUMENTS

| | | |
|---|---|---|
| DE | 3724663 A1 | 2/1989 |
| DE | 3744084 A1 | 7/1989 |
| EP | 2615441 A1 | 7/2013 |
| JP | H04-81602 A | 3/1992 |
| JP | H07-159382 A | 6/1995 |
| JP | 2000-187148 A | 7/2000 |
| JP | 2007-315815 A | 12/2007 |
| WO | 2012/033060 A1 | 3/2012 |
| WO | 2016/044601 A1 | 3/2016 |
| WO | 2016/044602 A1 | 3/2016 |

OTHER PUBLICATIONS

Oct. 31, 2018 Extended European Search Report issued in European Patent Application No. 17784826.4.

* cited by examiner

A-A' CROSS SECTION

FIG. 8

B-B' CROSS SECTION

DISPLACEMENT MEASURING DEVICE

TECHNICAL FIELD

The present invention relates to a displacement measuring device which linearly extends and contracts and measures a displacement of a displacement measuring object.

BACKGROUND ART

A three-dimensional displacement measuring system has been known as a displacement measuring device which is connected to a displacement measuring object which is relatively displaced and measures, for example, a relative three-dimensional displacement (refer to Patent Literature 1). The three-dimensional displacement measuring system accurately measures a behavior having six degrees of freedom of the displacement measuring object and realizes a system which is cheaper and smaller than a non-contact type system. Positioning of the three-dimensional displacement measuring system to the displacement measuring object is easy.

CITATION LIST

Patent Literature

Patent Literature 1: JP 2007-315815 A

SUMMARY OF INVENTION

Technical Problem

However, regarding the three-dimensional displacement measuring system of the related art disclosed in Patent Literature 1, in a three-dimensional displacement detecting unit included in the system, a displacement measuring device for detecting a displacement of a probe which is attached and fixed to the displacement measuring object is a wire-type device which detects a moving amount of wire for extending and contracting according to the extension and contraction of a connection rod.

Therefore, for example, when measuring a displacement of a rib part of a human body dummy for safety evaluation used for a vehicle collision test and so on, there has been a case where an extension and contraction speed of the wire of the wire-type displacement measuring device cannot catch up to a displacement speed of the rib part at the time of the collision. When a direction in which a collision power enters the rib part is oblique toward a fixed point of the displacement measuring device relative to a line segment for connecting two points where the probe and the displacement measuring device are placed, the extension and contraction of the connection rod may be prevented. In such a case, there is a problem in that the displacement of the displacement measuring object cannot be linearly and stably measured.

An object of the present invention is to solve the above problems in the related art and to provide a displacement measuring device which can linearly and stably measure a displacement of a displacement measuring object.

Solution to Problem

A displacement measuring device according to the present invention includes: a probe configured to have a telescopic structure that is capable of extending and contracting as a whole; and a measuring unit configured to measure a displacement of a front end relative to abase end of the probe, the probe includes a single cylindrical body or a plurality of cylindrical bodies having diameters different from each other and a columnar or cylindrical front end member that is movably inserted into the single cylindrical body or the cylindrical body having the smallest diameter of the plurality of cylindrical bodies and of which a front end is mounted to a displacement measuring object, and the single or the plurality of cylindrical bodies and the front end member have a rotation applying mechanism that applies a rotation movement in conjunction with a forward/backward movement when the inner cylindrical body or the front end member moves forward/backward relative to the outer cylindrical body in an extension and contraction direction.

According to one embodiment of the present invention, the measuring unit includes: a displacement detecting unit including a rotation displacement meter that is provided in the probe and detects a rotation angle of the cylindrical body having the largest diameter relative to the front end member; and a calculation unit that calculates a displacement of the displacement measuring object based on an output value from the displacement detecting unit.

According to another embodiment of the present invention, the measuring unit includes: a displacement detecting unit including a variable resistor that is provided in the probe and detects displacements of the cylindrical body having the largest diameter and the cylindrical body disposed on the inner side of the cylindrical body having the largest diameter in the extension and contraction direction; and a calculation unit that calculates a displacement of the displacement measuring object based on an output value from the displacement detecting unit.

According to yet another embodiment of the present invention, the rotation applying mechanism includes: groove portions that are provided in the outer cylindrical bodies and are inclined relative to the extension and contraction direction; and projection portions that are provided on outer peripheries of the inner cylindrical bodies or the front end member and are loosely fitted into the groove portions.

According to yet another embodiment of the present invention, the projection portions are disposed at equal intervals along a circumferential direction of the cylindrical bodies and the front end member, and the projection portions provided on the adjacent cylindrical bodies or the cylindrical body and the front end member adjacent to each other are disposed to be shifted from each other in the circumferential direction as viewed from the extension and contraction direction.

According to yet another embodiment of the present invention, the measuring unit includes an inclination angle detection unit including a plurality of rotation displacement meters that detects rotation angles around axes perpendicular to an axis of the probe and perpendicular to each other as an inclination angle of the entire device.

Advantageous Effects of Invention

According to the present invention, a displacement of a displacement measuring object can be linearly and stably measured.

DESCRIPTION OF EMBODIMENTS

The displacement measuring device according to embodiments of the present invention is described in detail below with reference to the attached drawings. However, the invention according to claims is not limited to the following embodiments. Furthermore, all the combination of features to be described in the embodiments are not necessarily required for solving the problems. The following embodiments are examples of a case where the displacement measuring device according to the present invention is applied in the body trunk skeletal part of the human body dummy for safety evaluation to be configured as a safety evaluation system.

Figure 1:
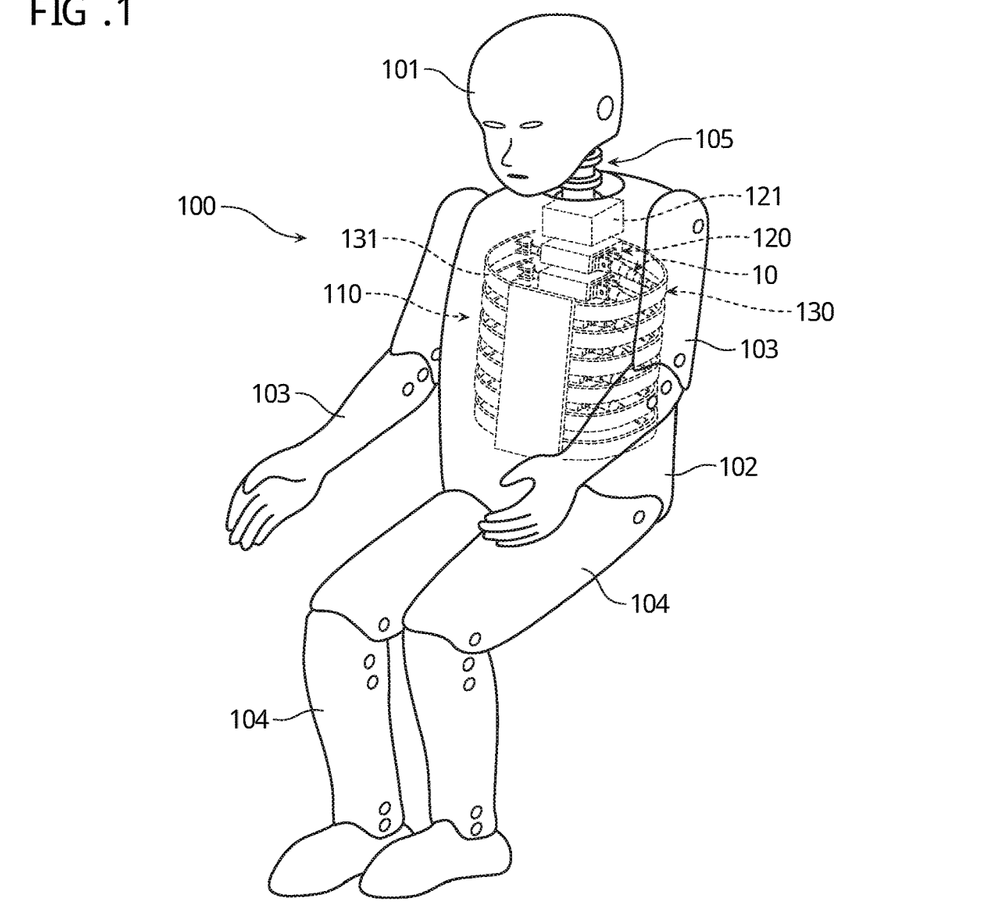
FIG. 1 is an entire external perspective view of a human body dummy for safety evaluation, which is partially transmissively illustrated, including a displacement measuring device according to a first embodiment of the present invention.
Figure 2:
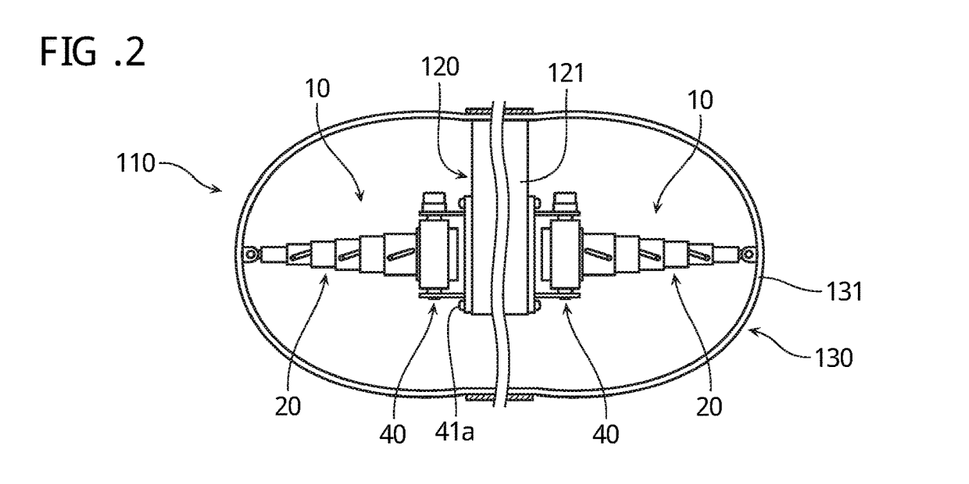
FIG. 2 is a top view of an arrangement form of the displacement measuring device in a body trunk skeletal part of the human body dummy for safety evaluation.
Figure 3:
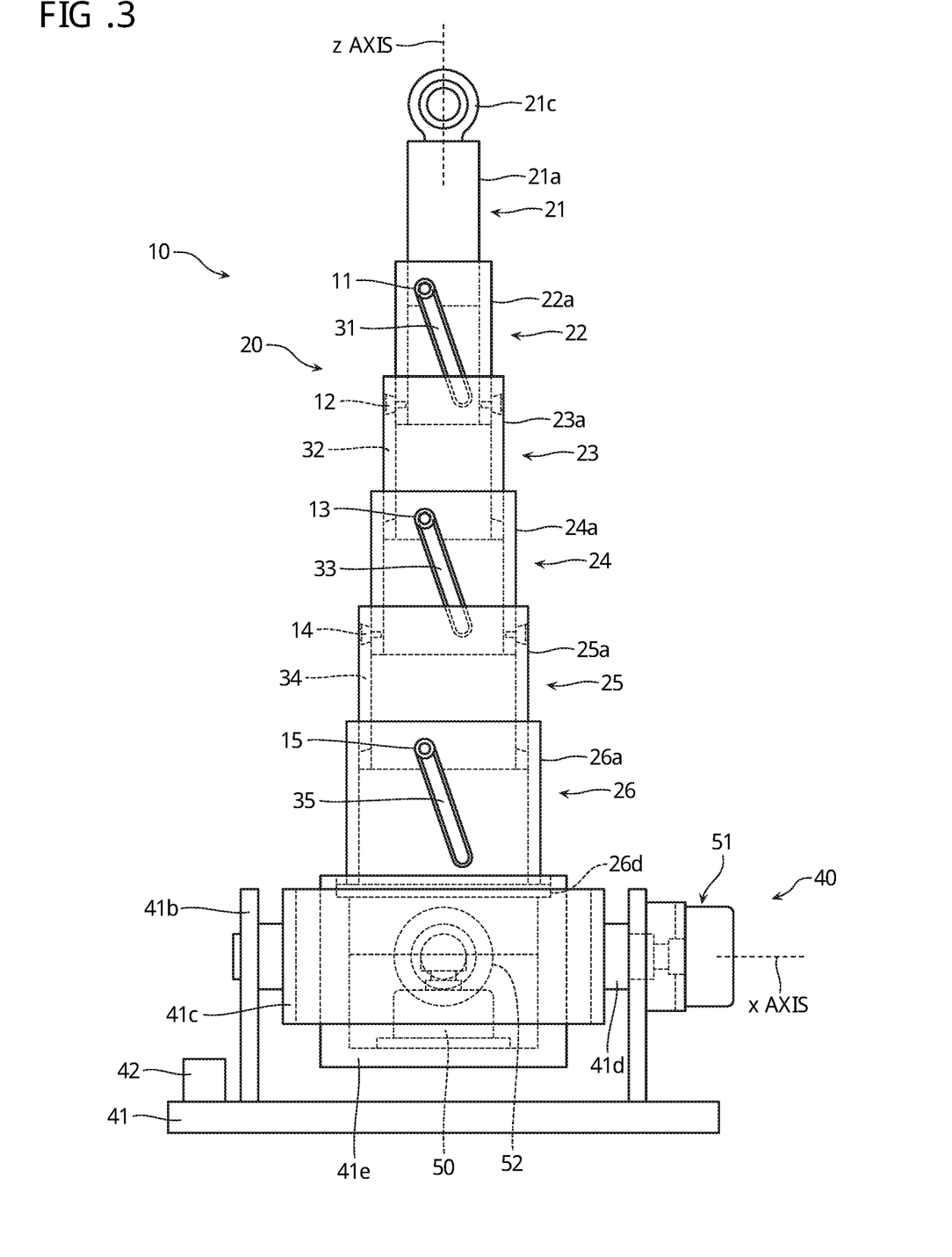
FIG. 3 is a front view of a state in which the displacement measuring device is extended at maximum.

FIG. 1 is an entire external perspective view of the human body dummy for safety evaluation, which is partially transmissively illustrated, including a displacement measuring device according to a first embodiment of the present invention. FIG. 2 is a top view of an arrangement form of the displacement measuring device in the body trunk skeletal part of the human body dummy for safety evaluation. FIG. 3 is a front view of a state in which the displacement measuring device is extended at maximum.

Figure 4:
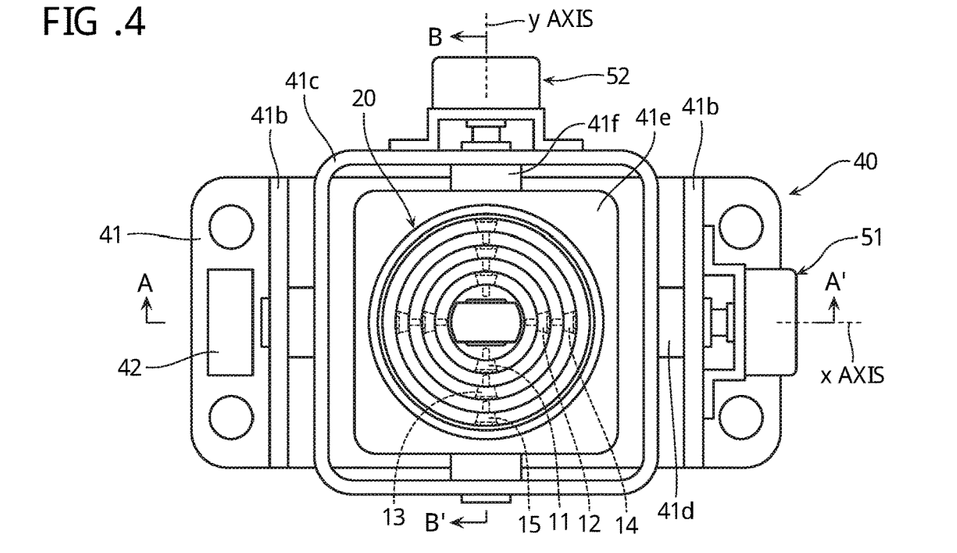
FIG. 4 is a top view of the displacement measuring device.
Figure 5:
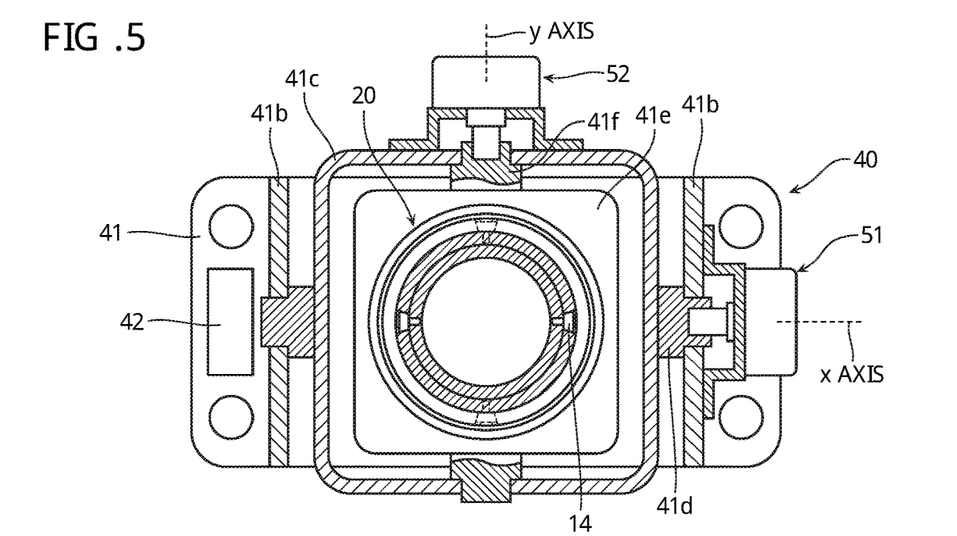
FIG. 5 is a top view of a partial cross section of the displacement measuring device.
Figure 6:
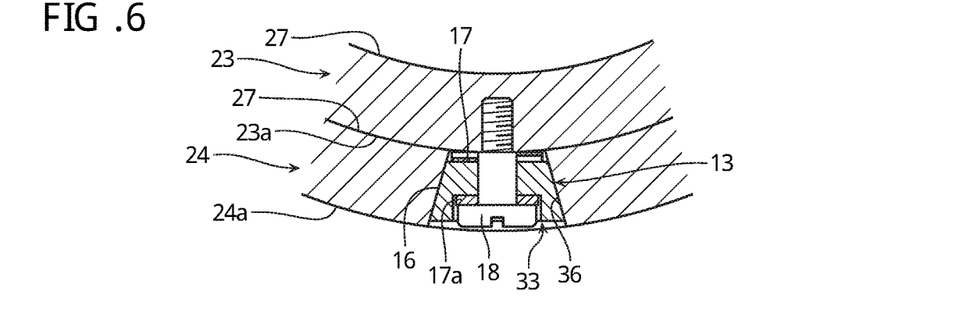
FIG. 6 is a partially enlarged view of FIG. 5.
Figure 7:
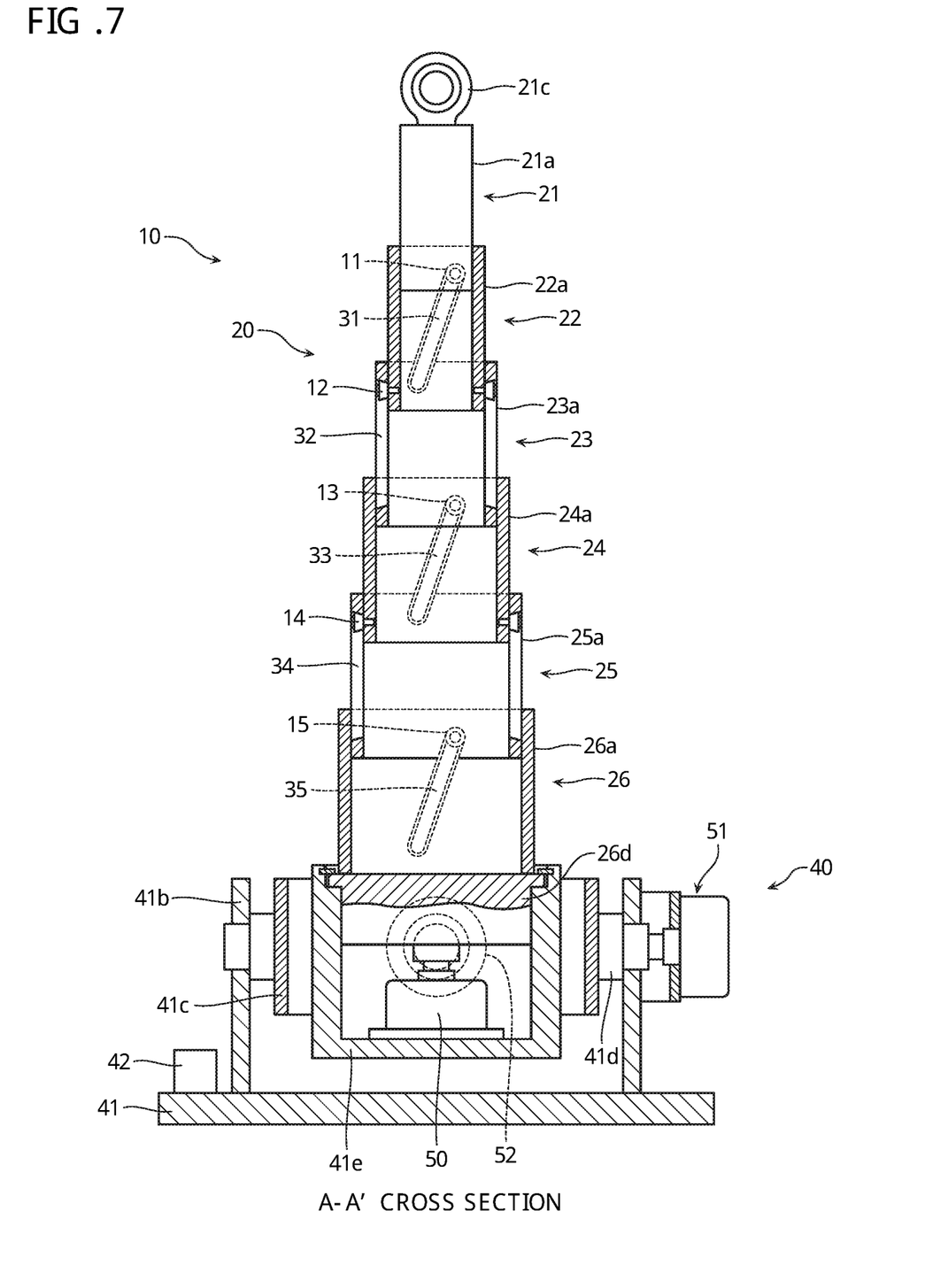
FIG. 7 is a sectional view taken along a line A-A' of FIG. 4.
Figure 8:
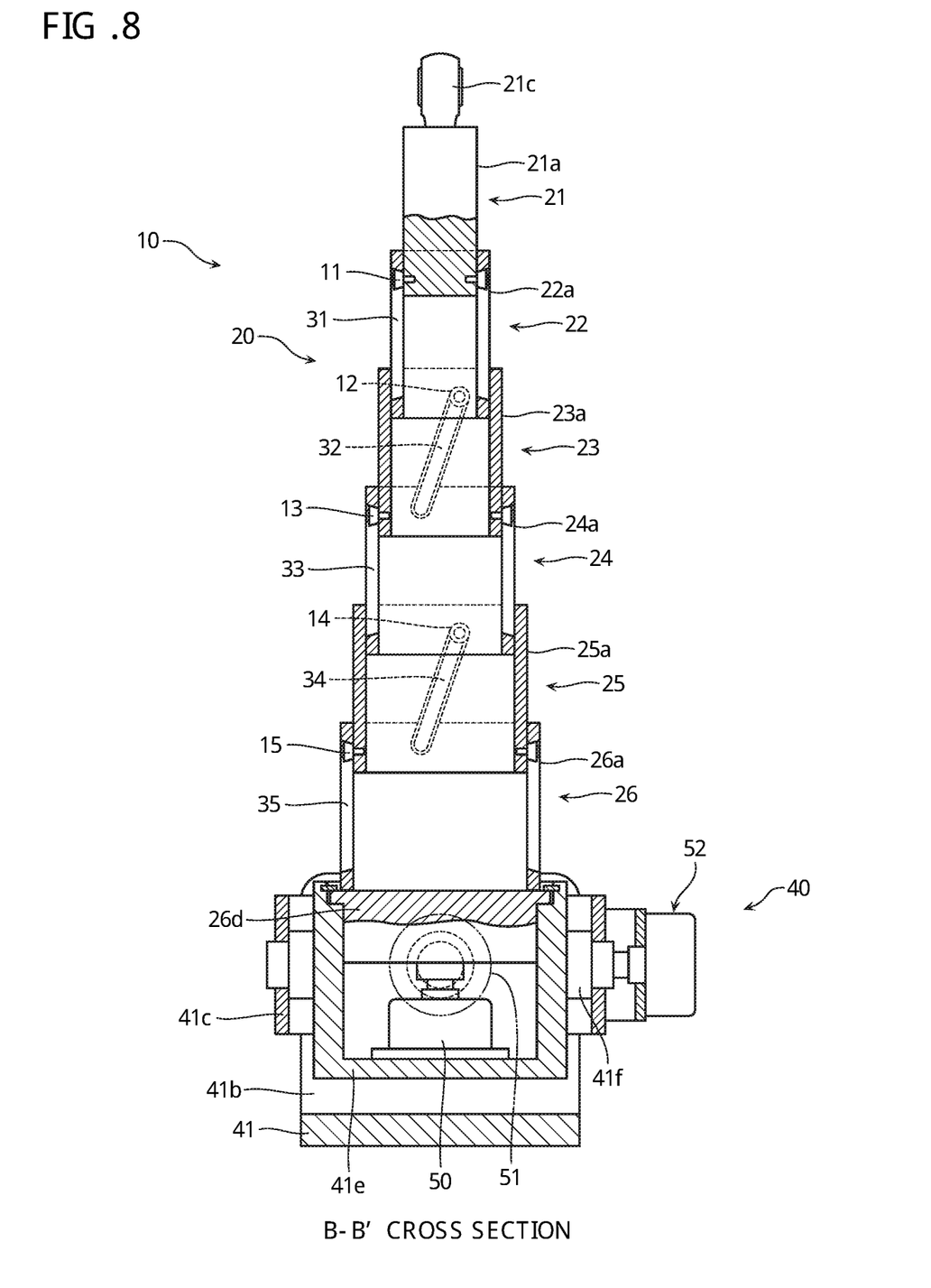
FIG. 8 is a sectional view taken along a line B-B' of FIG. 4.
Figure 9:
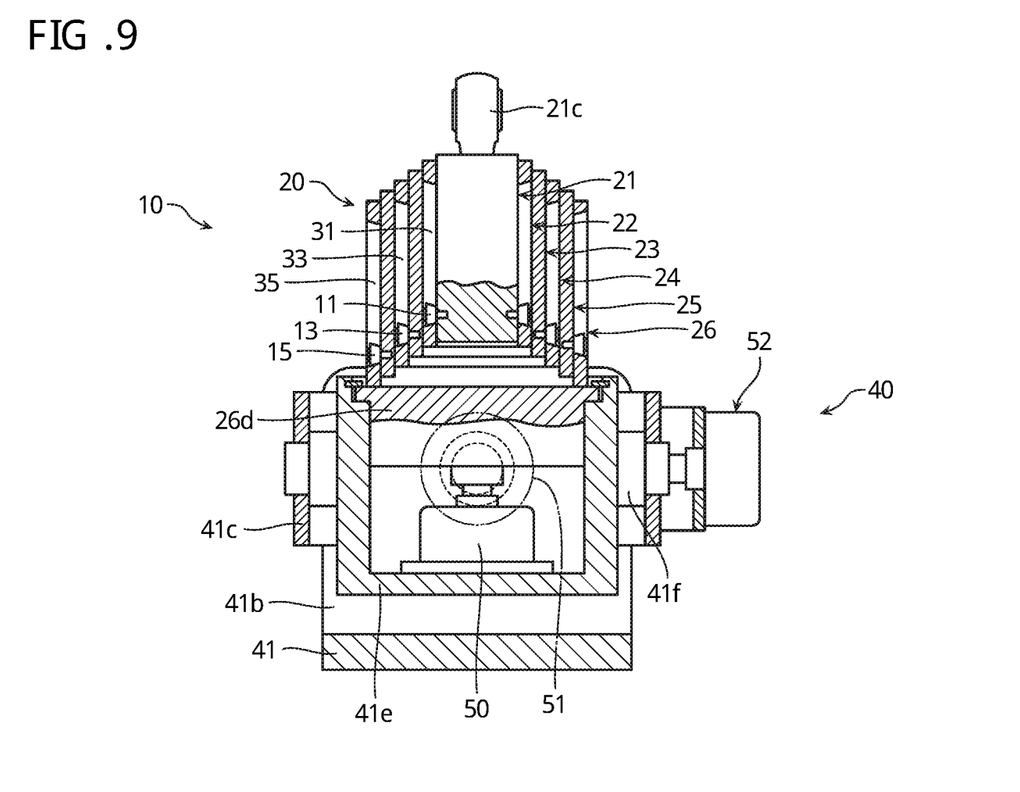
FIG. 9 is a sectional view of a state in which the displacement measuring device is contracted at minimum.

Furthermore, FIG. 4 is a top view of the displacement measuring device, and FIG. 5 is a top view of a partial cross section of the displacement measuring device. In addition, FIG. 6 is a partially enlarged view of FIG. 5, and FIG. 7 is a sectional view taken along a line A-A' of FIG. 4. FIG. 8 is a sectional view taken along a line B-B' of FIG. 4. FIG. 9 is a sectional view of a state in which the displacement measuring device is contracted at minimum.

As illustrated in FIG. 1, the human body dummy for safety evaluation (abbreviated as "human body dummy" below) 100 includes, for example, a head 101 including a neck skeleton part 105 and a trunk part 102 on which the head 101 is provided. The human body dummy 100 includes a pair of arms 103 attached to the trunk part 102 and a pair of legs 104 similarly attached to the trunk part 102. The trunk part 102 comprises a chest, an abdomen, and a waist of the human body dummy 100, for example.

A body trunk skeletal part 110 is included in the trunk part 102. The body trunk skeletal part 110 is provided, for example, in the trunk part 102 of the human body dummy 100 taking a sitting posture or standing posture. For example, the body trunk skeletal part 110 is connected to the head 101 via the neck skeleton part 105. The body trunk skeletal part 110 includes, for example, a spine part 120 which is similar to a spine of the human body and a thorax part 130 which is similar to a thorax of the human body.

The spine part 120 includes, for example, a plurality of vertebras 121. The thorax part 130 includes a plurality of rib parts 131, and each pair of rib parts 131 is provided relative to each one of vertebras 121 of the human body dummy 100 in the right and left direction. A plurality of displacement measuring devices 10 according to the first embodiment of the present invention is provided in the body trunk skeletal part 110.

Specifically, as illustrated in FIG. 2, in each displacement measuring device 10, probes 20 are provided on both right and left sides of the human body dummy 100 in a state where the probes 20 can be entirely extended and contracted in the right and left direction so that a deformation of the rib part 131 caused by the collision at the time of the collision test from the right and the left sides of the human body dummy 100 can be measured. That is, the displacement measuring devices 10 are disposed between the vertebra 121 and the rib parts 131 in the right and left sides, respectively, for example, so as to along the right and left direction passing through the center of the center portion of the body trunk skeletal part 110.

As illustrated in FIG. 2, each displacement measuring device 10 includes the probe 20 having a telescopic structure which can be extended and contracted as a whole in the right and left direction and a measuring unit 40 for measuring a displacement of the front end (on the side of rib part 131) relative to the base end (on the side of vertebra 121) of the probe 20. Therefore, the displacement measuring device 10 measures the displacements of the right and left rib parts 131 as the displacement measuring objects in the present embodiment.

As illustrated in FIGS. 3 to 5 and FIGS. 7 to 9, the measuring unit 40 of the displacement measuring device 10 has a plate-like mounting base 41. The mounting base 41 is attached and fixed to, for example, the vertebra 121 via a mounting bolt 41a (refer to FIG. 2). A pair of mounting plates 41b erected toward the probe 20 is provided on the mounting base 41.

A rotatable frame part 41c is rotatably mounted between the mounting plates 41b, for example, in parallel to a main surface of the mounting base 41 and around the x axis perpendicular to the z axis in the Z direction. For example, the rotatable frame part 41c is formed in a square frame-like shape as viewed from an extension and contraction direction of the probe 20 (Z direction). On the outer side of one of the mounting plates 41b, a rotation displacement meter 51 for detecting a rotation angle of a rotating shaft 41d of the rotatable frame part 41c is mounted.

On the other hand, on the inner side of the rotatable frame part 41c, a rotation base 41e is rotatably mounted, for example, around the y axis perpendicular to the z axis and the x axis. For example, the rotation base 41e is formed in a rectangular box shape. Furthermore, on one of the outer sides of the rotatable frame part 41c opposed to each other along the y axis, a rotation displacement meter 52 for detecting a rotation angle of a rotating shaft 41f of the rotation base 41e is mounted.

The mounting base 41, the mounting plates 41b, the rotatable frame part 41c, the rotating shaft 41d, the rotation base 41e, and the rotating shaft 41f form a gimbal mechanism having two degrees of freedom. The rotation displacement meters 51 and 52 form an inclination angle detection unit which detects respective rotation angles around the x axis and the y axis as an inclination angel of the whole displacement measuring device 10. A rotation displacement meter 50 connected to the probe 20 via a rotation plate 26d is included in the rotation base 41e.

The probe 20 of the displacement measuring device 10 includes a plurality of cylindrical bodies 22, 23, 24, 25, and 26 and a columnar or a cylindrical front end member 21. The cylindrical bodies 22 to 26 have diameters different from each other so that the whole probe 20 can be extended and contracted. The front end member 21 is movably inserted into the cylindrical body 22 having the smallest diameter from among the cylindrical bodies 22 to 26, and the front end of the front end member 21 is mounted and fixed to the rib part 131. The front end member 21 is mounted and fixed to, for example, the inner part of each of the right and left ends of the rib part 131 via a fixing ring 21c provided on the side of the front end of the front end member 21.

The probe 20 formed in this way has the following characteristics. That is, the cylindrical bodies 22 to 26 and the front end member 21 of the probe 20 have a rotation applying mechanism. When the inner cylindrical bodies 22 to 25 or the front end member 21 move forward/backward in the Z direction relative to the outer cylindrical bodies 22 to 26, the rotation applying mechanism applies the rotation movement in conjunction with the forward/backward movement. The rotation applying mechanism includes groove portions or guiding parts which are provided in the plurality of cylindrical bodies and inclined in the Z direction and projection portions or guide pins. The projection portions or the guide pins are provided in the outer periphery of each of the cylindrical bodies except for the cylindrical body having the largest diameter and the front end member to be loosely fitted into the groove portions of the cylindrical body adjacent on the outside. More specifically, the rotation applying mechanism includes inclined groove portions 31, 32, 33, 34, and 35 respectively provided in the cylindrical bodies 22 to 26 which are disposed on the outer side in order, for example.

The rotation applying mechanism includes projection portions 11, 12, 13, 14, and 15 provided to be respectively projected from outer peripheral surfaces 21a, 22a, 23a, 24a, and 25a which are outer peripheries of the respective cylindrical bodies 22 to 25 and the front end member 21 disposed on the inner side and loosely fitted into the groove portions 31 to 35 of the respective cylindrical bodies 22 to 26 adjacent on the outer side in order with a gap.

For example, the projection portions 11 to 15 are disposed at equal intervals along the circumferential direction of the cylindrical bodies 22 to 25 and the front end member 21. The projection portions 11 to 15 provided in the adjacent cylindrical bodies 22 to 25 or the cylindrical body 22 and the front end member 21 adjacent to each other are disposed to be shifted from each other in the circumferential direction as viewed from the Z direction. Specifically, for example, as illustrated in FIG. 4, the two projection portions 11 are provided at an interval of 180° in the circumferential direction of the front end member 21. The other projection portions 12 to 15 are provided two each at intervals of 180° in the circumferential direction of the respective cylindrical bodies 22 to 25.

The projection portions 12 to 15 provided in the adjacent cylindrical bodies 22 to 25 are disposed to be shifted from each other in the circumferential direction as viewed from the Z direction. In addition, the projection portions 12 and 11 respectively provided on the cylindrical body 22 and the front end member 21 adjacent to each other are disposed to be shifted from each other in the circumferential direction as viewed from the Z direction. More specifically, the projection portions 11 to 15 are disposed to be shifted to each other at intervals of 90° in the circumferential direction as viewed from the Z direction.

On the other hand, the groove portions 31 to 35 are formed to be inclined at a predetermined angle, for example, an angle of 2° to 30° (25° in the present embodiment) relative to the axis of each of the cylindrical bodies 22 to 26 (z axis). The groove portions 31 to 35 are provided, for example, at positions respectively corresponding to the projection portions 11 to 15. The groove portions 31 to 35, which are provided to be inclined at the predetermined angle in this way, and the projection portions 11 to 15 form the rotation applying mechanism which rotates and moves the outer cylindrical bodies 22 to 26 around the z axis in conjunction with the forward/backward movement when the cylindrical bodies 22 to 25 or the front end member 21 on the inner side move forward/backward relative to the outer cylindrical bodies 22 to 26 in the Z direction.

Three each of the projection portions 11 to 15 and the groove portions 31 to 35 may be disposed at equal intervals of 120° along the above circumferential direction, and the number of the projection portions and the groove portions to be provided may be more than three. By disposing the projection portions and the groove portions at equal intervals in the circumferential direction in this way, deviation of the force for extending and contracting the probe 20 can be prevented as possible.

It is preferable that the groove portions 31 to 35 and the projection portions 11 to 15 be formed as follows. Here, as illustrated in FIG. 6, the projection portion 13 and the groove portion 33 are exemplified. The other groove portions 31, 32, 34, and 35 and the projection portions 11, 12, 14, and 15 may be similarly formed.

The groove portion 33 may be formed in a tapered shape of which an opening diameter of a cut-away part inner peripheral surface 36 of the opening part becomes wider from the side of an inner peripheral surface 27 of the cylindrical body 24 toward the outer peripheral surface 24a. Accordingly, the projection portion 13 loosely fitted into the groove portion 33 may be formed to have a tapered projected outer peripheral surface 16 corresponding to the cut-away part inner peripheral surface 36.

As illustrated in FIG. 6, for example, the projection portion 13 is mounted to the outer peripheral surface 23a of the cylindrical body 23 via a wave washer 17 with a mounting bolt 18. A flat washer 17a is provided between a head part of the mounting bolt 18 and the projection portion 13. With this structure, the cut-away part inner peripheral surface 36 of the groove portion 33 and the projected outer peripheral surface 16 of the projection portion 13 corresponding to each other are maintained to be loosely fitted into each other by the surface contact under an appropriate angle and abutting force when both surfaces are slides with each other at the time of rotation movement according to the forward/backward movement.

Although not shown, the projection portions 11 to 15 are disposed not only at equal intervals in the circumferential direction, but also the plurality of projection portions 11 to 15 may be provided along the longitudinal direction of each of the groove portions 31 to 35. In this way, the extension and contraction of the probe 20 can effectively prevent the front end member 21 and the cylindrical bodies 22 to 26 from moving forward/backward with the inclination relative to the z axis.

As described above, the rotation plate 26d is mounted on the base end side of the cylindrical body 26 having the largest diameter relative to the front end member 21. Therefore, the rotation displacement meter 50 connected to the probe 20 via the rotation plate 26d can detect the rotation angle of the cylindrical body 26 having the largest diameter of the cylindrical bodies 22 to 26 which rotates according to the extension and contraction of the probe 20 to obtain the displacement of the front end relative to the base end of the probe 20. An output from each of the rotation displacement meters 50 to 52 is input to, for example, a sensor circuit 42 provided on the mounting base 41. It is desirable that an output rotation angle relative to all displacement of the probe 20 be large as possible in a range not to exceed 360° so that a resolution of the rotation displacement meter 50 is high. Therefore, the output rotation angle of the rotation displacement meter 50 is set to be, for example, 60° to 360°, more preferably, 180° to 360°.

The sensor circuit 42 calculates a displacement (distance) in the Z direction of the rib part 131 based on an output value from the rotation displacement meter 50 indicating the rotation angle of the cylindrical body 26 having the largest diameter detected in accordance with the displacement of the rib part 131. The sensor circuit 42 calculates inclination angles of the x axis and the y axis of the displacement measuring device 10 based on the output values from the rotation displacement meters 51 and 52. Then, the sensor circuit 42 calculates a three-dimensional displacement of the rib part 131 based on the output values from the rotation displacement meters 50 to 52.

With this structure, when the displacement measuring device 10 according to the first embodiment measures the displacement of the rib part 131, the probe 20 can be entirely contracted according to the displacement speed of the rib part 131. Even when the input direction of the collision force to the rib part 131 is oblique as described above, the contraction of the probe 20 is not prevented, by the action of the rotation applying mechanism caused by the projection portions 11 to 15 and the groove portions 31 to 35. Therefore, the displacement of each rib part 131 can be linearly and stably measured. Since the probe 20 has a telescopic structure including the above rotation applying mechanism, the displacement measuring device 10 can be repeatedly used for the measurements. Since the structures of the units including the probe 20 and the measuring unit 40 are simple, the displacement measuring device 10 can be inexpensively manufactured.

Figure 10:
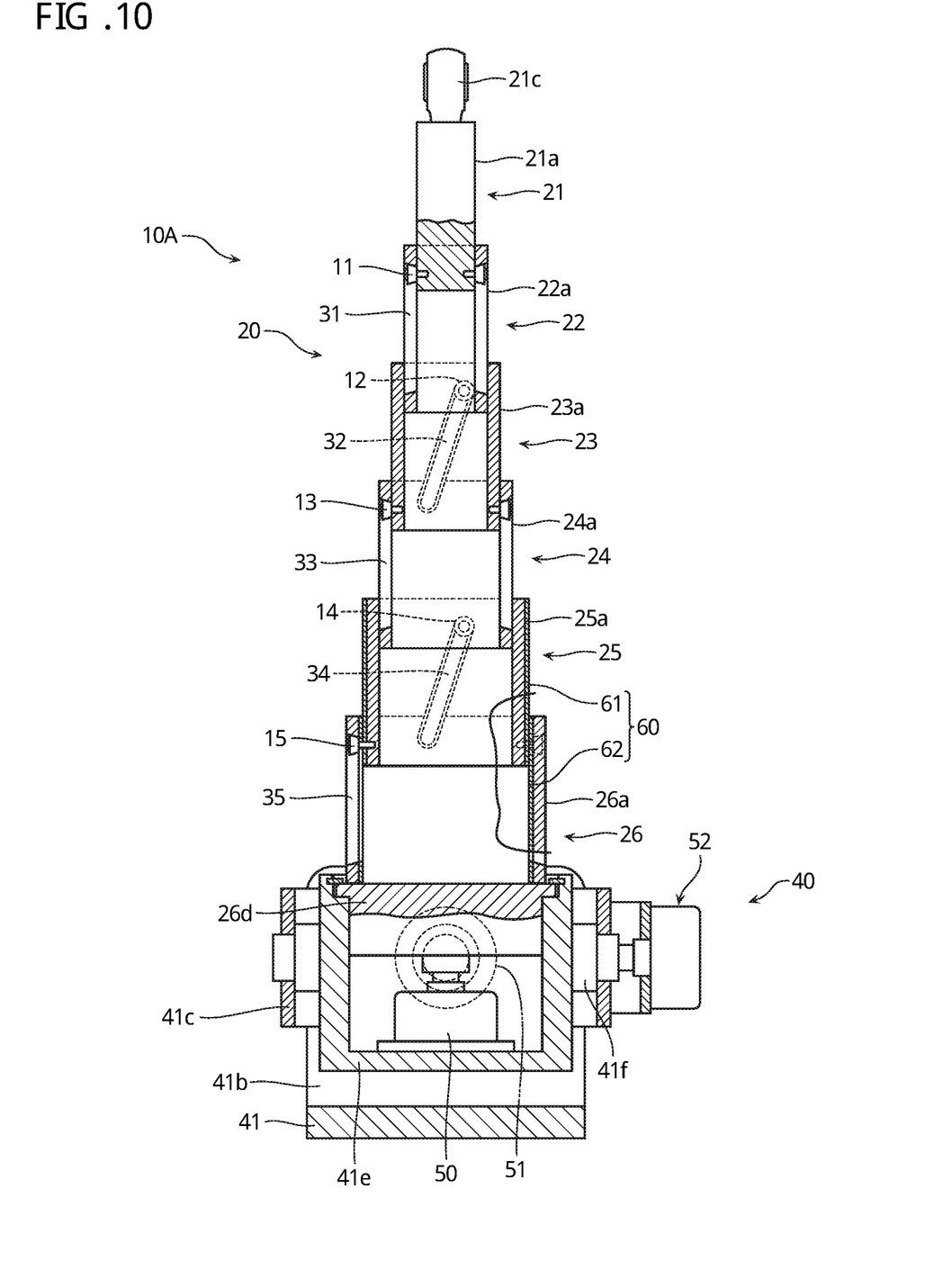
FIG. 10 is a front view of a displacement measuring device according to a second embodiment of the present invention.

FIG. 10 is a front view of a displacement measuring device according to a second embodiment of the present invention. In the following description including FIG. 10, the components same as those in the first embodiment are denoted with the same reference numerals. Therefore, the overlapped description is omitted below.

As illustrated in FIG. 10, a displacement measuring device 10A according to the second embodiment of the present invention includes the probe 20 and the measuring unit 40 having the structures similar to those in the displacement measuring device 10 according to the first embodiment. However, the rotation displacement meter 50 of the measuring unit 40 is included in the rotation base 41e, and a variable resistor 60 is additionally provided in the probe 20. In this point, the displacement measuring device 10A is different from that in the first embodiment. Accordingly, the displacement can be linearly and stably measured with higher accuracy.

The variable resistor 60 can detect relative displacement between the cylindrical body 26 having the largest diameter and the cylindrical body 25 provided on the inner side of the cylindrical body 26 relative to the front end member 21 in the Z direction. Specifically, the variable resistor 60 includes a slider 61 provided on the outer peripheral surface 25a of the cylindrical body 25 and a resistor 62 provided on the inner peripheral surface 27 of the cylindrical body 26. A curved line provided over the cylindrical bodies 25 and 26 illustrated in FIG. 10 indicates that apart divided by the curved line is a partial cross section different from the cross section of the entire device. An output value from the variable resistor 60 is input to the sensor circuit 42 together with the output value of the rotation displacement meter 50, and a displacement (distance) of the rib part 131 in the Z direction is calculated based on the output values. The sensor circuit 42 may calculate the displacement of the rib part 131 by obtaining a moving distance of the front end member 21 in the Z direction based on the result of the multiplication of the number of cylindrical bodies 22 to 26, which is used as a coefficient, by the input output value.

With this structure, the effect similar to that of the first embodiment can be obtained. The variable resistor 60 may be built in the rotation base 41e via the rotation plate 26d similarly to the rotation displacement meter 50 according to the first embodiment and detect and output the rotation displacement of the cylindrical body 26 as a change in a resistance value.

Some embodiments according to the present invention have been described above. However, the embodiments are only exemplary, and it is not intended that the embodiments limit the scope of the invention. It is possible to carry out the novel embodiments in the various other forms, and the embodiments can be variously omitted, replaced, and changed without departing from the gist of the claims. The embodiments and modifications are included in the scope and the gist of the invention, and included in the invention described in the claims and the range equivalent to the invention.

For example, in the above embodiments, the displacement of the front end relative to the base end of the probe 20 of each of the displacement measuring devices 10 is detected by the rotation displacement meter 50, and the displacement of the front end relative to the base end of the probe 20 of the displacement measuring device 10A is detected by the rotation displacement meter 50 and the variable resistor 60. However, the displacement measuring device may include only the variable resistor 60 instead of the rotation displacement meter 50. Even in this case, since the side of the base end of the probe 20 is rotated by the rotation applying mechanism according to the extension and the contraction of the probe 20, effects of a creak and a distortion become smaller than those in the measurement by using a linear movement only, and accurate measurement can be achieved. Furthermore, regarding the rotation applying mechanism, the groove portions 31 to 35 may be formed in spiral or helical shapes relative to the cylindrical bodies 22 to 26, and a forming position relation between the projection portions 11 to 15 and the groove portions 31 to 35 may be opposite to that in the above example. In addition, various other forms can be employed as the shapes of the projection portions 11 to 15 and the groove portions 31 to 35 in the above embodiments as long as the loosely fitting state is maintained. Furthermore, the probe 20 may include a single cylindrical body and a front end member to be movably inserted into the cylindrical body.

REFERENCE SIGNS LIST 10, 10A: displacement measuring device
11 to 15: projection portion 16: projected outer peripheral surface
20: probe
21: front end member
21a: outer peripheral surface
21c: fixing ring
22 to 26: cylindrical body
22a to 26a: outer peripheral surface
26d: rotation plate
27: inner peripheral surface
31 to 35: groove portion
36: cut-away part inner peripheral surface
40: measuring unit
41: mounting base
41c: rotatable frame part
41e: rotation base
42: sensor circuit
50 to 52: rotation displacement meter
60: variable resistor
61: slider
62: resistor
100: human body dummy
102: trunk part
110: body trunk skeletal part
120: spine part
121: vertebrata
130: thorax part
131: rib part

The invention claimed is:

1. A displacement measuring device comprising:
a probe configured to have a telescopic structure that is capable of extending and contracting as a whole; and
a measuring unit configured to measure a displacement of a front end relative to a base end of the probe,
the probe including a single cylindrical body or a plurality of cylindrical bodies having diameters different from each other and a columnar or cylindrical front end member that is movably inserted into the single cylindrical body or the cylindrical body having the smallest diameter of the plurality of cylindrical bodies and of which a front end is mounted to a displacement measuring object, and
the single or the plurality of cylindrical bodies and the front end member having a rotation applying mechanism that applies a rotation movement in conjunction with a forward/backward movement when an inner cylindrical body of the cylindrical bodies or the front end member moves forward/backward relative to an outer cylindrical body of the cylindrical bodies in an extension and contraction direction, wherein
the rotation applying mechanism includes:
groove portions that are provided in the outer cylindrical bodies of the cylindrical bodies and are inclined relative to the extension and contraction direction; and
guide pins that are provided on outer peripheries of the inner cylindrical bodies of the cylindrical bodies or the front end member and are loosely fitted into the groove portions.

2. The displacement measuring device according to claim 1, wherein
the measuring unit includes:
a displacement detecting unit including a rotation displacement meter that is provided in the probe and detects a rotation angle of the cylindrical body having the largest diameter relative to the front end member; and
a calculation unit that calculates a displacement of the displacement measuring object based on an output value from the displacement detecting unit.

3. The displacement measuring device according to claim 2, wherein
the measuring unit includes an inclination angle detection unit including a plurality of rotation displacement meters that detects rotation angles around axes perpendicular to an axis of the probe and perpendicular to each other as an inclination angle of the entire device.

4. The displacement measuring device according to claim 1, wherein
the measuring unit includes:
a displacement detecting unit including a variable resistor that is provided in the probe and detects displacements of the cylindrical body having the largest diameter and the cylindrical body disposed on the inner side of the cylindrical body having the largest diameter in the extension and contraction direction; and
a calculation unit that calculates a displacement of the displacement measuring object based on an output value from the displacement detecting unit.

5. The displacement measuring device according to claim 4, wherein
the measuring unit includes an inclination angle detection unit including a plurality of rotation displacement meters that detects rotation angles around axes perpendicular to an axis of the probe and perpendicular to each other as an inclination angle of the entire device.

6. The displacement measuring device according to claim 1, wherein
the guide pins are disposed at equal intervals along a circumferential direction of the cylindrical bodies and the front end member, and the guide pins provided on the adjacent cylindrical bodies or the cylindrical body and the front end member adjacent to each other are disposed to be shifted from each other in the circumferential direction as viewed from the extension and contraction direction.

7. The displacement measuring device according to claim 6, wherein
the measuring unit includes an inclination angle detection unit including a plurality of rotation displacement meters that detects rotation angles around axes perpendicular to an axis of the probe and perpendicular to each other as an inclination angle of the entire device.

8. The displacement measuring device according to claim 1, wherein
the measuring unit includes an inclination angle detection unit including a plurality of rotation displacement meters that detects rotation angles around axes perpendicular to an axis of the probe and perpendicular to each other as an inclination angle of the entire device.

* * * * *